(12) United States Patent
Aguillón-García et al.

(10) Patent No.: US 9,837,925 B1
(45) Date of Patent: Dec. 5, 2017

(54) CAPACITOR-LESS POWER SUPPLY

(71) Applicants: Jacobo Aguillón-García, Incheon (KR); Pedro Bañuelos-Sánchez, Puebla (MX); Juan Antonio Navarro-Martínez, Puebla (MX)

(72) Inventors: Jacobo Aguillón-García, Incheon (KR); Pedro Bañuelos-Sánchez, Puebla (MX); Juan Antonio Navarro-Martínez, Puebla (MX)

( * ) Notice: Subject to any disclaimer, the term of this patent is extended or adjusted under 35 U.S.C. 154(b) by 0 days.

(21) Appl. No.: 15/340,148

(22) Filed: Nov. 1, 2016

(51) Int. Cl.
*H02M 7/06* (2006.01)
*H02M 7/04* (2006.01)
*H02M 7/08* (2006.01)
*H02M 1/14* (2006.01)

(52) U.S. Cl.
CPC .............. *H02M 7/06* (2013.01); *H02M 1/14* (2013.01)

(58) Field of Classification Search
CPC ........ H02M 7/06; H02M 7/043; H02M 7/062; H02M 7/08; H02M 1/14; H02M 1/143
See application file for complete search history.

(56) References Cited

U.S. PATENT DOCUMENTS

| | | | |
|---|---|---|---|
| 8,797,776 B2 | 8/2014 | Kwong et al. | |
| 9,072,126 B2 * | 6/2015 | Ge | H05B 33/0887 |
| 9,300,217 B2 | 3/2016 | Liang et al. | |
| 9,735,685 B2 * | 8/2017 | Li | H02M 3/33507 |
| 2010/0026208 A1 * | 2/2010 | Shteynberg | H05B 33/0815 |
| | | | 315/297 |
| 2012/0274291 A1 * | 11/2012 | Ge | H02M 3/33523 |
| | | | 323/267 |
| 2014/0285102 A1 | 9/2014 | Jain et al. | |

* cited by examiner

*Primary Examiner* — Timothy J Dole
*Assistant Examiner* — Sisay G Tiku
(74) *Attorney, Agent, or Firm* — Grossman Tucker Perreault & Pfleger PLLC

(57) ABSTRACT

The present disclosure provides a capacitor-less AC/DC converter power supply system. The power supply system includes one or more rectifier cells having inductive and synchronous elements, and removing any capacitive filter elements thus ensuring a very high Mean Time Before Failure (MTBF) on the rectifier stage. The output voltage and current generated by the one or more inductive cells is a DC signal having a ripple amount dependent upon the number of cells implemented.

18 Claims, 4 Drawing Sheets

CAPACITOR-LESS POWER SUPPLY

TECHNICAL FIELD

The present disclosure relates to power supply systems, and more particularly, to power supply systems that eliminate capacitors.

BACKGROUND

Peak rectifier circuits change AC into pulsed DC by eliminating the negative half-cycles or alternating the AC voltage. Only a series of pulsations of positive polarity remain. Conventional rectifiers are classified according to the number of AC conducted positive half-cycles (i.e. half-wave rectifiers or full-wave rectifiers). Two types of circuits are used for full-wave, single-phase rectification: One circuit uses a transformer with a mid-tap in the secondary winding and a pair of rectifier diodes; the other uses a bridge diode configuration which requires two extra rectifier diodes and, in case of employ a transformer after the AC input voltage, the secondary requires only half as much winding. Performances are similar except that the bridge diodes are subjected to only half the peak inverse voltage of the center-tap circuit.

As both halves of the cycle are rectified, the current and voltage on the input side are normal effective values; RMS values on the output side are the same as for a sine wave while the DC or average values are twice that of a half-wave circuit. A Fourier analysis of the rectifier output waveform yields a constant term (DC voltage) and a series of harmonic terms. Filters are usually added to extract the constant term and attenuate harmonic terms. Inductor-input filters are preferred in higher-power applications in order to avoid excessive turn-on and repetitive surge currents. However, the use of an inductor alone is generally impractical, particularly when variable loads must be handled because the attenuation is not sufficient with reasonable values of inductance. When capacitor-input filters are used, diodes whose average rating more nearly matches the load requirement can be used if a source-to-load resistance ratio of about 0.03 and voltage regulation of about 10% are acceptable. A capacitor-input filter has a shunt capacitor presented to the rectifier output. Each time the positive peak alternating voltage is applied to one of the rectifier anodes, the input capacitor charges up to just slightly less than this peak voltage.

No current is delivered to the filter until another anode approaches its peak positive potential. When the capacitor is not being charged, its voltage drops off nearly linearly with time because the load draws a substantially constant current. Use of an input capacitor increases the average voltage across the output terminals of the rectifier and reduces the amplitude of the ripple in the rectifier output voltage. In any case, the capacitor charges up to the peak voltage of the rectifier output during the time that current pulses are delivered to the filter load. If the capacitance is large, more energy is stored during current pulses and the capacitor output voltage remains relatively high during discharge. On the other hand, if the load current is large, the capacitor discharges rapidly between current pulses and the average DC output voltage falls to a low value. This continuous charge-discharge cycle stress imposed on the filter capacitor contributes to the aging of the device and eventually to its failure. Replacing capacitors periodically is the only way to insure a very high Mean Time Before Failure (MTBF) for capacitors.

DC Aluminum electrolytic capacitors use an aluminum oxide layer as the dielectric and a dielectric grade aluminum foil as the current input bias. Both the materials and the processing have non-uniformities on a small scale. Two elementary mechanisms lead to capacitor field aging. The first is due to the leakage currents and the second one has to do with physical conditions such combinations of heat and chemical contaminant.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Figure 1:
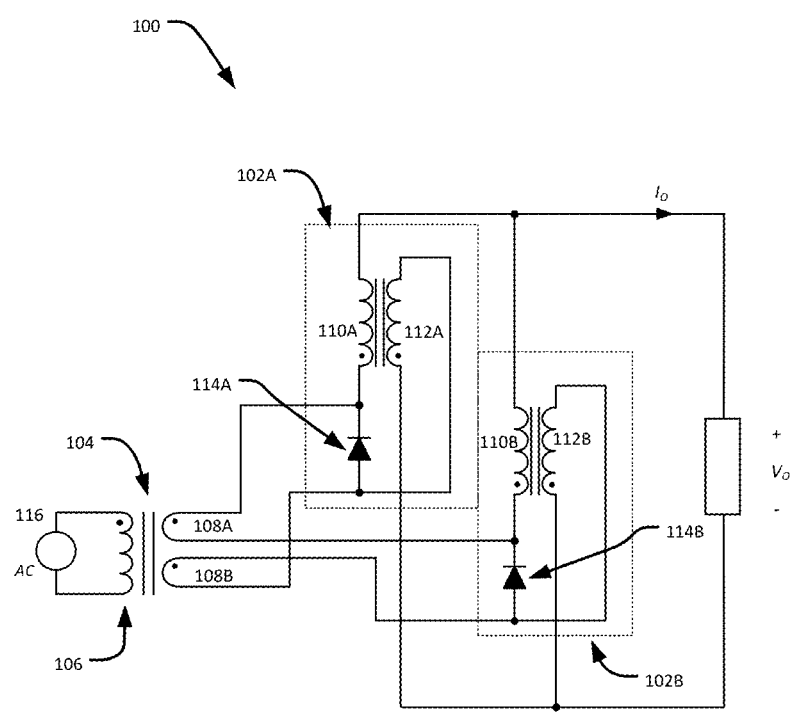
FIG. 1 illustrates an example power supply system consistent with various embodiments of the present disclosure.

FIG. 1 illustrates an example power supply system 100 consistent with various embodiments of the present disclosure. The power supply system 100 of FIG. 1 represents a AC/DC converter system, for example, to generate DC output voltage ($V_O$) and current ($I_O$) from an input voltage source 116 (Vin), the input voltage 116 may include a sinusoidal such as conventional wall outlet voltage sources (e.g., 110 VAC, etc.), and/or square signal source as in a switched-mode power supply (SMPS) equipment. The power supply system 100 includes a plurality of inductive cells 102A and 102B. Although two inductive cells 102A and 102B are shown in FIG. 1, it is to be understood that the power supply system 100, in other embodiments, may be extended to n number of cells; where n is an even number. Multiple cells may reduce a ripple of the DC output voltage, but may increase cost and/or complexity of the system 100. In general, the number of cells for a given implementation may depend on, for example, the load tolerance to ripple, etc. Each inductive cell 102A and 102B includes inductive coupled elements 110A, 112A and 110B, 112B, respectively, and a synchronous rectifier circuitry 114A and 114B, respectively. The inductive coupled elements 110A, 112A and 110B, 112B may each include, for example, transformer circuitry, etc., and the polarity of the inductive elements are coupled in a "same" polarity configuration, as shown. The synchronous rectifier circuitry 114A and 114B may each include, for example, diode circuitry as shown. In other embodiments, the synchronous rectifier circuitry 114A and 114B may include, for example, switch elements (e.g., MOSFET devices) having body diode elements biased in a similar manner. In such an embodiment, controller circuitry (not shown) may be provided to control the conduction state of the switch elements based on, for example, the various operating modes described below. In at least one embodiment, the inductive coupled elements 110A, 112A and 110B, 112B may each have similar electrical characteristics, e.g., impedance, inductance, etc., and may each be similarly sized. Of course, similar in this sense may depend on tolerance requirements for a given implementation. The diode circuitry 114A, 114B may also have similar electrical characteristics.

The power supply system 100 also includes input transformer circuitry 104 having a primary side 106 coupled to Vin, and a plurality of secondary sides, e.g., 108A and 108B. Secondary side 108A is coupled to inductive element 110A of cell 102A and inductive element 110B of cell 102B. Secondary side 108B is coupled to inductive element 112A of cell 102A and inductive element 112B of cell 102B. The number of secondary sides 108A and 108B may generally correspond to the number of inductive cells 102A and 102B. The secondary sides 108A, 108B are coupled to the primary side 106 in a "same" polarity configuration, as shown. The input transformer circuitry 104 is generally provided to reduce Vin (step down) and to provide Vin to each of the inductive cells 102A, 102B in an alternating fashion. The turns ratio of 108A and 108B may be the same or similar, so that the voltage of the secondary side of transformer 104 is alternating between 108A and 108B. As shown in FIG. 1, the dot side of 108A is coupled to the cathode of 114A and the dot side of 108B is coupled to the anode of 114B, thus creating an alternating conduction between cells 102A and 102B. In at least one embodiment, the stepped-down voltage provided by each secondary side 108A, 108B may be similar, e.g., the number of windings of each of the secondary sides 108A, 108B is the same or approximately the same. Diode circuitry 114A is coupled between a positive terminal of secondary side 108A and a negative terminal of secondary side 108B, forward biased toward inductive element 110A. Diode circuitry 114B is coupled between a negative terminal of secondary side 108A and a positive terminal of secondary side 108B, forward biased toward inductive element 110B.

For an even number of inductive cells, 2, 4, 6 . . . n, an output current ripple frequency will generally be the double of the frequency in Vin. This may be beneficial due since the ripple is smaller, and therefore the inductive cells act as ripple filters, without the need for filtering capacitor stages. In addition, the inductive cells provide full-wave rectification of the input voltage.

Figure 2:
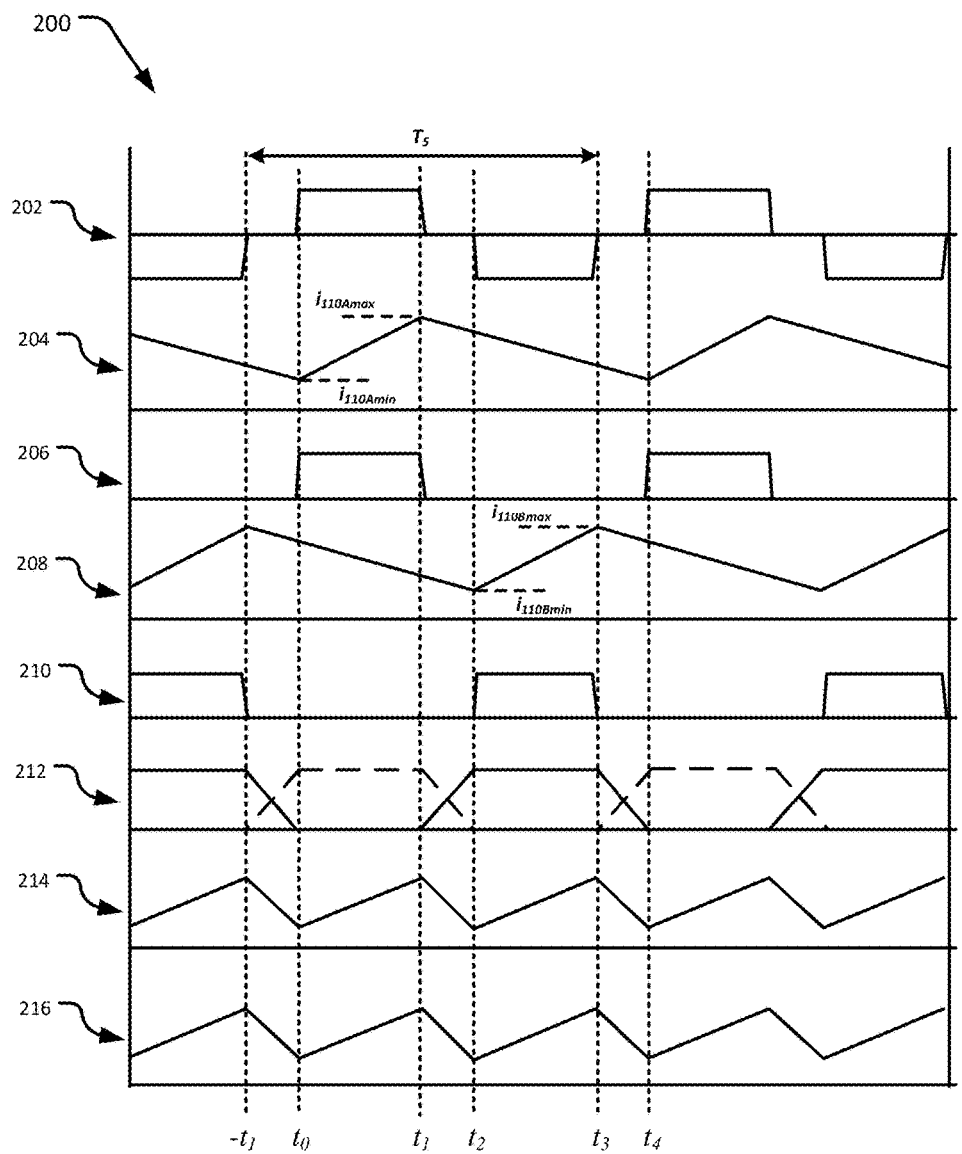
FIG. 2 illustrates a timing diagram for various signals in connection with the operation of the power supply system of FIG. 1.

FIG. 2 illustrates a timing diagram 200 for various signals in connection with the operation of the power supply system of FIG. 1. The time period $[-t_1, t_3]$ represents a commutation period, $T_S$, of the secondary sides 108A, 108B of the input transformer 104. ($T_S$ may also be defined in time period $[t_0, t_4]$, but for purposes of this embodiment $T_S$ is defined in time period $[-t_1, t_3]$). Waveform 202 represents the cell voltage of inductive cell 102A (negative portions) and inductive cell 102B (positive portions), $V_{Cell1, 2}$. Waveform 204 represents the current of the inductive coupled elements 110A, 112A of cell 102A, $i_{110A, 112A}$. Waveform 206 represents the voltage across the diode 114A of cell 102A, $V_{D1}$. Waveform 208 represents the current of the inductive coupled elements 110B, 112B of cell 102B, $i_{110B, 112B}$. Waveform 210 represents the voltage across the diode 114B of cell 102B, $V_{D2}$. The solid signals of waveform 212 represent the current through the diode 114A of cell 102A, $I_{D1}$, and the broken-line signals of waveform 212 represent the current through the diode 114B of cell 102B, $I_{D2}$. Waveform 214 represents the output current, $I_O$, and waveform 216 represents the output voltage, $V_O$. With continued reference to the power supply system of FIG. 1 and the timing diagram of FIG. 2, various operational states are described below:

State I[$-t_1, t_0$] and [$t_1, t_2$]:

This state occurs when the voltage of secondary sides 108A and 108B are approximately equal to 0, which corresponds to when the AC input is approximately zero. In this state, the power supply 100 can generally be considered to be in a freewheeling state. In State I, diodes 114A and 114B are in forward bias, since the voltage stored in inductive elements 112A and 112B exceeds the positive voltage of the secondary sides 108A and 108B. The current generated by inductive cell 102A is continuing to ramp down, as shown by waveform 204. Similarly, the current generated by inductive cell 102B begins to ramp down, as shown by waveform 208. The voltage across diodes 114A and 114B is approximately zero, as shown by waveforms 206 and 210, respectively. The current through diode 114A begins ramping down during the period $[-t_1, t_0]$, as energy stored in inductive element 112A dissipates, and begins ramping up during the period $[t_1, t_2]$ as energy stored in inductive element 112A begins to increase, as shown by waveform 212 (solid lines). The current through diode 114B begins ramping up during the period $[-t_1, t_0]$, as energy stored in inductive element 112B increases, and begins ramping down during the period $[t_1, t_2]$ as energy stored in inductive element 112B begins dissipates, as shown by waveform 212 (dashed lines). Output current ($I_O$) and output voltage ($V_O$) begin to decrease during these periods, but remain positive and therefore supplying power to a load, as shown by waveforms 214 and 216, respectively. The maximum peak current delivered by each cell, as indicated by $i_{110Amax}$ of waveform 204, is based on the input voltage (Vin), load impedance ($R_O$) and time, as described in detail below. The minimum current delivered by each cell, as indicated by $i_{110Amin}$ of waveform 204, is based on the input voltage (Vin), load impedance ($R_O$) and time, as described in detail below. The total output current, $I_O$, is generated by the sum of current from each cell. Waveforms 204, 208 and 214 are depicted as normalized, and may have different values depending on particular operating conditions. Waveform 214 is a composite (sum) of waveforms 204 and 208.

State II[$t_0, t_1$]:

State II begins when the voltage of cell 102A is positive (waveform 202), and diode 114A is in a reverse bias state and diode 114B is in a forward bias state. The voltage across diode 114A is positive (waveform 206), and the current through cell 102A ramps up from $i_{110Bmin}$ to $i_{110Bmax}$ during this period (waveform 204). The voltage across diode $D_2$ (114B) is approximately zero (waveform 210), and the current through cell 102B continues to decrease (waveform 208). The current through diode 114A is approximately zero (waveform 212—solid lines) and the current through diode 114B is at the maximum (waveform 212—dashed lines). Output current, $I_O$, is provided by cell 102B. Thus, current of cell 102B (waveform 208) is discharging and decreasing while the output load current (waveform 214) is increasing.

State III [$t_2, t_3$]:

State III is similar to State II, and begins when the voltage of cell 102B is negative (waveform 202), and diode 114B is in a reverse bias state and diode 114A is in a forward bias state. The voltage across diode 114A is approximately zero (waveform 206), and the current through cell 102A continues to decrease from State I (waveform 208). The voltage across diode $D_2$ (114B) is positive (waveform 210), and the current through cell 102B ramps up from $i_{110Amin}$ to $i_{110Amax}$ during this period (waveform 208). The current through diode 114A is at a maximum (waveform 212—solid lines) and the current through diode 114B is approximately zero (waveform 212—dashed lines). Output current, $I_O$, is provided by cell 102A Thus, current of cell 102A (waveform 204) is discharging and decreasing while the output load current (waveform 214) is increasing.

Advantageously, the output current ($I_O$) and the output voltage ($V_O$) are rectified DC signals with low ripple and are generated without the use of any capacitive elements. Thus, the power supply system described herein may offer increased mean time between failures (MTBF) performance due to non-aging elements of the power supply.

Figure 3:
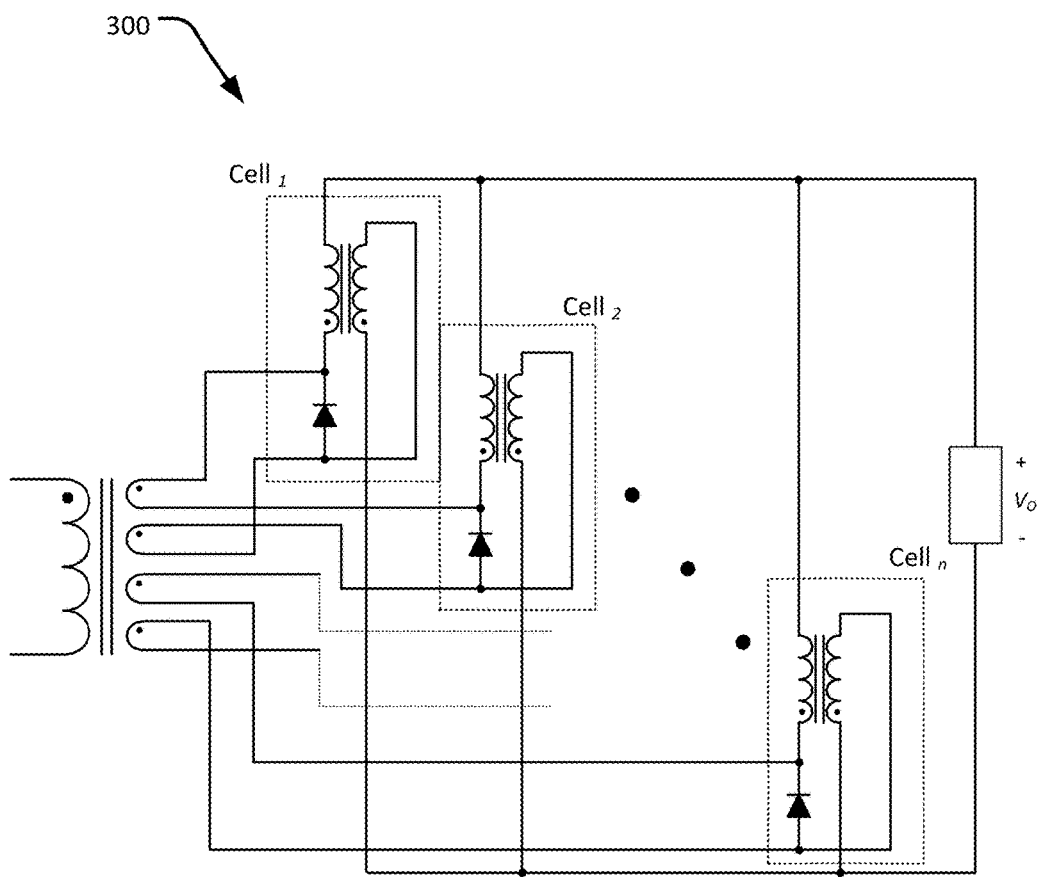
FIG. 3 illustrates a power supply system according to other embodiments of the present disclosure.

FIG. 3 illustrates a power supply system 300 according to other embodiments of the present disclosure. As described above with reference to FIG. 1, the power supply system 100 may include n number of inductive cells. As the number of cells increase, the ripple of the output voltage ($V_O$) and output current ($I_O$) may decrease. Accordingly, FIG. 3 illustrates a supply system having n number of cells, $Cell_1$, $Cell_2$ ... $Cell_n$, where n is an even number. The coupling of the various elements of each cell is illustrated. Also, in this embodiment, the number of secondary sides of the input transformer circuitry generally correspond to the number of cells.

Figure 4:
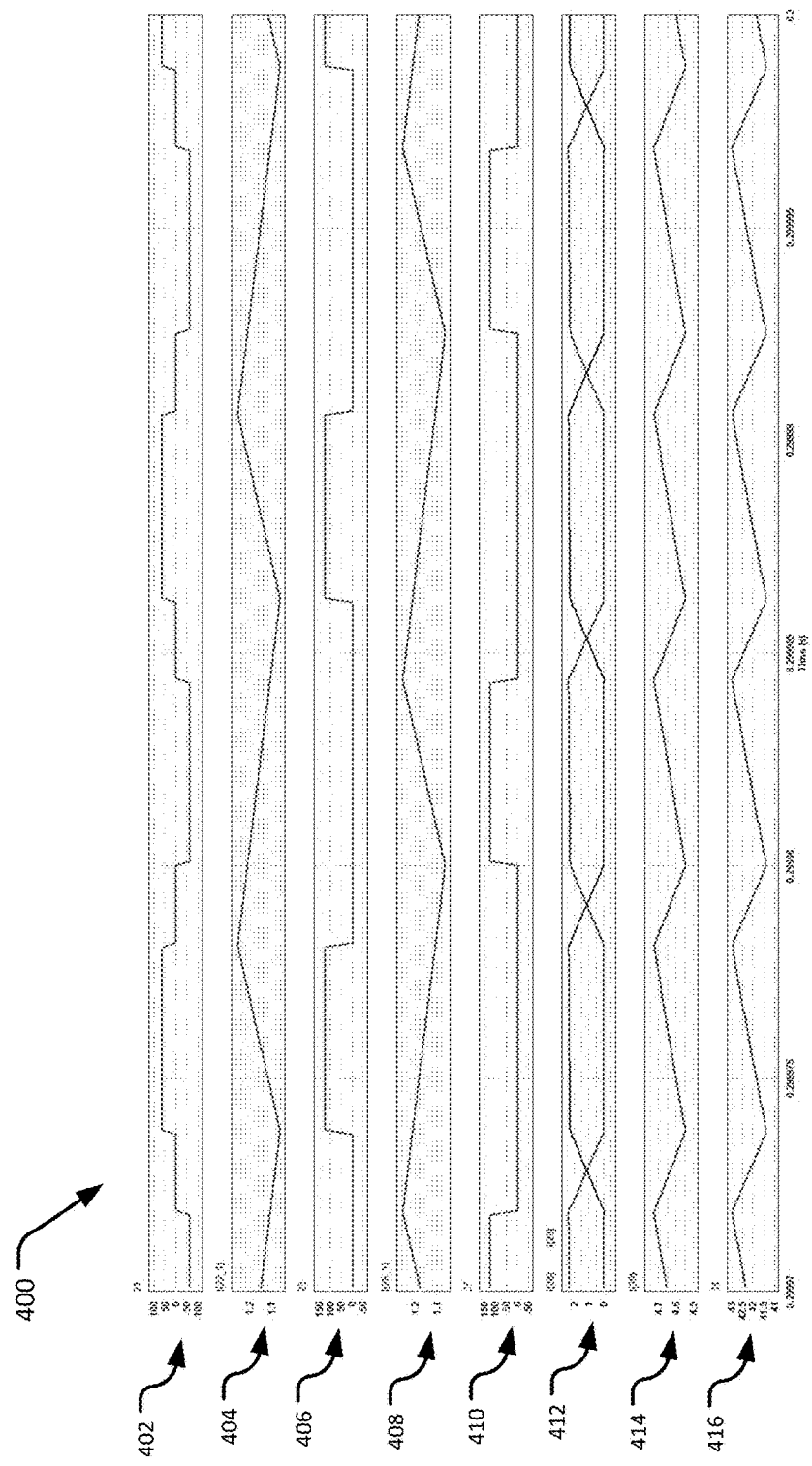
FIG. 4 illustrates a timing diagram of a simulation of a 2-cell power supply system of FIG. 1 or FIG. 3.

FIG. 4 illustrates a timing diagram 400 of a simulation of a 2-cell power supply system of FIG. 1. Similar to the timing diagram of FIG. 2, Waveform 402 represents the cell voltage of inductive cell 102A (negative portions) and inductive cell 102B (positive portions), $V_{Cell1,\ 2}$. Waveform 404 represents the current of the inductive coupled elements 110A of cell 102A, $i_{110A}$. Waveform 406 represents the voltage across the diode 114A of cell 102A, $V_{D1}$. Waveform 408 represents the current of the inductive coupled elements 110B of cell 102B, $i_{110B}$. Waveform 410 represents the voltage across the diode 114B of cell 102B, $V_{D2}$. The solid signals of waveform 412 represent the current through the diode 114A of cell 102A, $I_{D1}$, and the broken-line signals of waveform 412 represent the current through the diode 114B of cell 102B, $I_{D2}$. Waveform 414 represents the output current, $I_O$, and waveform 416 represents the output voltage, $V_O$.

Design Considerations

With continued reference to FIGS. 1 and 2, taking into account that $Cell_1$ corresponds to 102A and $Cell_2$ to 102B; the following conditions for the steady-state analysis of the power supply system 100 are assumed: the power source from the primary side is an ideal AC voltage source, inductors are designed to operate in continuous inductor current mode (CICM), all semiconductors are ideal and passive components do not contain stray elements, the output voltage is constant during a commutation period $T_S$, and the operative modes are referenced to the input voltage according to time interval $\Delta t_i$ from the period $[t_i, t_{i+1}]$.

The behavioral result of the proposed circuit with the currents $i_{110Amin}$ and $i_{110Amax}$ as the difference of current in the inductive cell 102A for an output resistive impedance $R_O$ are given as:

$$i_{110Amin} = \frac{V_{102A}}{R_O}\left[\frac{e^{kt_{on}}-1}{e^k-1}\right]-I_O;\ i_{110Amax} = \frac{V_{102A}}{R_O}\left[\frac{e^{kt_{off}}-1}{e^{-k}-1}\right]-I_O$$

$$\Delta I_{102A} = |i_{110Amax} - i_{110Amin}|$$

$$\therefore \Delta I_{102A} = \frac{V_{102A}}{R_O}\left[\frac{1-e^{-kt_{on}}+e^{-k}+e^{-kt_{off}}}{1-e^{-k}}\right]$$

for $k=(T_S R_O)/L$

Where $t_{on}$ is defined as the interval $[t_0, t_1]$ and $t_{off}$ is $[t_1, t_4]$ as shown in FIG. 2. Considering all the powering operative modes and extending for n cell number, the following may be affirmed:

$$I_{102A}=I_{110A}-I_{112A}; I_{102B}=I_{110B}-I_{112B};\ ...$$

where, $I_{Cell\ 1}=I_{102A}$; $I_{Cell\ 2}=I_{102B}$; ...

$$\overset{yields}{\Longrightarrow} I_O = \sum_{n=1}^{}I_{cell_n}$$

With an $I_O$ ripple frequency twice the current ripple frequency 204.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The circuitry may, collectively or individually, be embodied as modules that form part of a larger system, for example, an integrated circuit (IC), system on-chip (SoC), desktop computers, laptop computers, tablet computers, servers, smart phones, etc.

Thus, the present disclosure provides an AC/DC power supply system that includes input transformer circuitry having a primary side and first and second inductively-coupled secondary sides, the primary side to receive an alternating voltage source; the first secondary side having a first terminal and a second terminal and having a step down voltage compared to the primary side; the second secondary side having a third terminal and a fourth terminal and having a step down voltage compared to the primary side. The power supply system also includes first inductive cell circuitry having a first inductive element having a first terminal coupled to the first terminal of the first secondary side and a second terminal coupled to a positive output terminal, and a second inductive element inductively coupled to the first inductive element and having a third terminal coupled to a negative output terminal and a fourth terminal coupled to fourth terminal of the second secondary side. The power supply system also includes second inductive cell circuitry having a third inductive element having a fifth terminal coupled to the second terminal of the first secondary side and a sixth terminal coupled to the positive output terminal, and a fourth inductive element inductively coupled to the third inductive element and having a seventh terminal coupled to the negative output terminal and an eighth terminal coupled to third terminal of the second secondary side. Advantageously, the power supply system may be implemented without using output capacitor circuitry, thus saving on cost and part count, as well as increasing operational life of the power supply.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:
1. An AC/DC power supply system, comprising:
input transformer circuitry having a primary side and first and second inductively coupled secondary sides, the primary side to receive an alternating voltage source;
the first secondary side having a first terminal and a second terminal and having a step down voltage compared to the primary side; the second secondary side having a third terminal and a fourth terminal and having a step down voltage compared to the primary side;

first inductive cell circuitry having a first inductive element having a first terminal coupled to the first terminal of the first secondary side and a second terminal coupled to a positive output terminal, and a second inductive element inductively coupled to the first inductive element and having a third terminal coupled to a negative output terminal and a fourth terminal coupled to fourth terminal of the second secondary side; and second inductive cell circuitry having a third inductive element having a fifth terminal coupled to the second terminal of the first secondary side and a sixth terminal coupled to the positive output terminal, and a fourth inductive element inductively coupled to the third inductive element and having a seventh terminal coupled to the negative output terminal and an eighth terminal coupled to third terminal of the second secondary side.

2. The AC/DC power supply system of claim 1, wherein the first and second secondary sides have approximately the same turns ratio with the primary side, and the first and second secondary side are each inductively coupled in a same polarity to the primary side.

3. The AC/DC power supply system of claim 1, wherein the first inductive element and second inductive element have approximately the same number of windings, and each are inductively coupled in a same polarity with a positive terminal of the first inductive element being coupled to the first terminal of the first inductive element.

4. The AC/DC power supply system of claim 1, wherein the third inductive element and fourth inductive element have approximately the same number of windings, and each are inductively coupled in a same polarity with a positive terminal of the third inductive element being coupled to the fifth terminal of the third inductive element.

5. The AC/DC power supply system of claim 1, wherein the first inductive cell circuitry and the second inductive cell circuitry have approximately the same turns ratio.

6. The AC/DC power supply system of claim 1, wherein the first inductive cell circuitry further comprising first rectifier circuitry coupled between the first terminal of the first inductive element and the fourth terminal of the second inductive element.

7. The AC/DC power supply system of claim 6, wherein the first rectifier circuitry comprises diode circuitry coupled in forward bias toward the first terminal of the first inductive element.

8. The AC/DC power supply system of claim 1, wherein the second inductive cell circuitry further comprising second rectifier circuitry coupled between the fifth terminal of the third inductive element and the eighth terminal of the fourth inductive element.

9. The AC/DC power supply system of claim 8, wherein the second rectifier circuitry comprises diode circuitry coupled in forward bias toward the eighth terminal of the fourth inductive element.

10. The AC/DC power supply system of claim 1, wherein the power supply system does not include output smoothing capacitor circuitry.

11. An AC/DC power supply system, comprising:
input transformer circuitry having a primary side and first and second inductively-coupled secondary sides, the primary side to receive an alternating voltage source; the first secondary side having a first terminal and a second terminal and having a step down voltage compared to the primary side; the second secondary side having a third terminal and a fourth terminal and having a step down voltage compared to the primary side;

first inductive cell circuitry having a first inductive element having a first terminal coupled to the first terminal of the first secondary side and a second terminal coupled to a positive output terminal; a second inductive element inductively coupled to the first inductive element and having a third terminal coupled to a negative output terminal and a fourth terminal coupled to fourth terminal of the second secondary side; and first rectifier circuitry coupled between the first terminal of the first inductive element and the fourth terminal of the second inductive element; and second inductive cell circuitry having a third inductive element having a fifth terminal coupled to the second terminal of the first secondary side and a sixth terminal coupled to the positive output terminal; a fourth inductive element inductively coupled to the third inductive element and having a seventh terminal coupled to the negative output terminal and an eighth terminal coupled to third terminal of the second secondary side; and second rectifier circuitry coupled between the fifth terminal of the third inductive element and the eighth terminal of the fourth inductive element.

12. The AC/DC power supply system of claim 11, wherein the first and second secondary sides have approximately the same turns ratio with the primary side, and the first and second secondary side are each inductively coupled in a same polarity to the primary side.

13. The AC/DC power supply system of claim 11, wherein the first inductive element and second inductive element have approximately the same number of windings, and each are inductively coupled in a same polarity with a positive terminal of the first inductive element being coupled to the first terminal of the first inductive element.

14. The AC/DC power supply system of claim 11, wherein the third inductive element and fourth inductive element have approximately the same number of windings, and each are inductively coupled in a same polarity with a positive terminal of the third inductive element being coupled to the fifth terminal of the third inductive element.

15. The AC/DC power supply system of claim 11, wherein the first inductive cell circuitry and the second inductive cell circuitry have approximately the same turns ratio.

16. The AC/DC power supply system of claim 11, wherein the first rectifier circuitry comprises diode circuitry coupled in forward bias toward the first terminal of the first inductive element.

17. The AC/DC power supply system of claim 11, wherein the second rectifier circuitry comprises diode circuitry coupled in forward bias toward the eighth terminal of the fourth inductive element.

18. The AC/DC power supply system of claim 11, wherein the power supply system does not include output smoothing capacitor circuitry.

* * * * *